US011987472B2

(12) United States Patent
Pahlke

(10) Patent No.: US 11,987,472 B2
(45) Date of Patent: May 21, 2024

(54) AIR PRESSURE SENSOR ALGORITHM TO DETECT ELEVATOR DIRECTION OF MOTION

(71) Applicant: OTIS ELEVATOR COMPANY, Farmington, CT (US)

(72) Inventor: Derk Oscar Pahlke, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 1421 days.

(21) Appl. No.: 16/400,448

(22) Filed: May 1, 2019

(65) Prior Publication Data

US 2020/0346891 A1 Nov. 5, 2020

(51) Int. Cl.
*B66B 1/34* (2006.01)
*B66B 5/00* (2006.01)

(52) U.S. Cl.
CPC .......... *B66B 1/3492* (2013.01); *B66B 5/0018* (2013.01)

(58) Field of Classification Search
CPC ............................ B66B 1/3492; B66B 5/0018
See application file for complete search history.

(56) References Cited

U.S. PATENT DOCUMENTS

| | | | | |
|---|---|---|---|---|
| 4,367,811 | A | 1/1983 | Yoneda et al. | |
| 10,822,199 | B2 * | 11/2020 | Pahlke | B66B 5/0018 |
| 2010/0088908 | A1 | 4/2010 | Matzker et al. | |
| 2017/0225921 | A1 * | 8/2017 | Scoville | B66B 5/0018 |
| 2019/0064199 | A1 * | 2/2019 | Bogli | G01C 21/188 |
| 2020/0307954 | A1 * | 10/2020 | Pahlke | B66B 5/0018 |
| 2021/0032076 | A1 * | 2/2021 | Pahlke | G01C 5/06 |
| 2021/0087017 | A1 * | 3/2021 | Pahlke | B66B 13/22 |
| 2021/0087018 | A1 * | 3/2021 | Pahlke | B66B 1/3492 |
| 2021/0094794 | A1 * | 4/2021 | Pahlke | B66B 5/0018 |

FOREIGN PATENT DOCUMENTS

| | | | |
|---|---|---|---|
| CN | 104875209 | A | 9/2015 |
| CN | 104909232 | A | 9/2015 |
| CN | 105712142 | B | 1/2018 |
| CN | 108408516 | A | 8/2018 |
| CN | 108861917 | A | 11/2018 |
| CN | 108946367 | A | 12/2018 |
| CN | 108726299 | A | 9/2020 |
| EP | 3450990 | A1 | 3/2019 |
| WO | 2011032660 | A2 | 3/2011 |

OTHER PUBLICATIONS

Chinese Office Action for Application No. 202010349180.X; dated Feb. 14, 2022; 9 Pages.
European Search Report for Application No. 20172607.2; dated Oct. 6, 2020; 10 Pages.
Chinese Office Action for Application No. 202010349180.X; dated Oct. 20, 2022; 12 Pages.

* cited by examiner

*Primary Examiner* — Jeffrey Donels
(74) *Attorney, Agent, or Firm* — CANTOR COLBURN LLP

(57) ABSTRACT

A method of monitoring a direction of motion of a conveyance apparatus within a conveyance system including: detecting a first height at a first time; detecting a second height at a first selected time period prior to the first time; detecting a height change of a conveyance apparatus within the conveyance system in response to the first height and the second height; determining whether the height change is greater than a first selected height change; and determining that the conveyance apparatus is moving in an upward direction when the height change is greater than the first selected height change.

6 Claims, 5 Drawing Sheets

AIR PRESSURE SENSOR ALGORITHM TO DETECT ELEVATOR DIRECTION OF MOTION

BACKGROUND

The embodiments herein relate to the field of conveyance systems, and specifically to a method and apparatus for monitoring a position of a conveyance apparatus of a conveyance system.

A precise position of a conveyance apparatus within a conveyance systems, such as, for example, elevator systems, escalator systems, and moving walkways may be difficult and/or costly to determine.

BRIEF SUMMARY

According to an embodiment, a method of monitoring a direction of motion of a conveyance apparatus within a conveyance system is provided. The method including: detecting a first height at a first time; detecting a second height at a first selected time period prior to the first time; detecting a height change of a conveyance apparatus within the conveyance system in response to the first height and the second height; determining whether the height change is greater than a first selected height change; and determining that the conveyance apparatus is moving in an upward direction when the height change is greater than the first selected height change.

In addition to one or more of the features described herein, or as an alternative, further embodiments may include that detecting the height change of the conveyance apparatus within the conveyance system further includes: detecting a first atmospheric air pressure within the conveyance system proximate the conveyance apparatus at the first time; detecting a second atmospheric air pressure within the conveyance system proximate the conveyance apparatus at the first selected time period prior to the first time; determining a change in atmospheric air pressure within the conveyance system proximate the conveyance apparatus in response to the first atmospheric air pressure and the second atmospheric air pressure within the conveyance system; and determining the height change of a conveyance apparatus within the conveyance system in response to the change in atmospheric air pressure within the conveyance system proximate the conveyance apparatus.

In addition to one or more of the features described herein, or as an alternative, further embodiments may include: applying an upward corrective value to the first time and the first time period prior to the first time; and determining that the conveyance apparatus was moving in the upward direction in a time period between the first time minus the upward corrective value and the first selected time period prior to the first time minus the upward corrective value.

In addition to one or more of the features described herein, or as an alternative, further embodiments may include that the conveyance system is an elevator system and the conveyance apparatus is an elevator car.

According to another embodiment, a method of monitoring a direction of motion of a conveyance apparatus within a conveyance system is provided. The method including: detecting a first height at a first time; detecting a second height at a first selected time period prior to the first time; detecting a height change of a conveyance apparatus within the conveyance system in response to the first height and the second height; determining whether the height change is less than a first selected height change; and determining that the conveyance apparatus is moving in a downward direction when the height change is less than the first selected height change.

In addition to one or more of the features described herein, or as an alternative, further embodiments may include that detecting the height change of the conveyance apparatus within the conveyance system further includes: detecting a first atmospheric air pressure within the conveyance system proximate the conveyance apparatus at the first time; detecting a second atmospheric air pressure within the conveyance system proximate the conveyance apparatus at the first selected time period prior to the first time; determining a change in atmospheric air pressure within the conveyance system proximate the conveyance apparatus in response to the first atmospheric air pressure and the second atmospheric air pressure within the conveyance system; and determining the height change of a conveyance apparatus within the conveyance system in response to the change in atmospheric air pressure within the conveyance system proximate the conveyance apparatus.

In addition to one or more of the features described herein, or as an alternative, further embodiments may include: applying a downward corrective value to the first time and the first time period prior to the first time; and determining that the conveyance apparatus was moving in the downward direction in a time period between the first time minus the downward corrective value and the first selected time period prior to the first time minus the downward corrective value.

In addition to one or more of the features described herein, or as an alternative, further embodiments may include that the conveyance system is an elevator system and the conveyance apparatus is an elevator car.

According to another embodiment, a method of monitoring a direction of motion of a conveyance apparatus within a conveyance system, the method including: detecting a first height at a first time; detecting a second height at a first selected time period prior to the first time; detecting a height change of a conveyance apparatus within the conveyance system in response to the first height and the second height; determining whether the height change is greater than a first selected height change; and determining that the conveyance apparatus is not moving in an upward direction when the height change is not greater than the first selected height change.

In addition to one or more of the features described herein, or as an alternative, further embodiments may include: determining whether the height change is less than the first selected height change; and determining that the conveyance apparatus is moving in a downward direction when the height change is less than the first selected height change.

In addition to one or more of the features described herein, or as an alternative, further embodiments may include that detecting the height change of the conveyance apparatus within the conveyance system further includes: detecting a first atmospheric air pressure within the conveyance system proximate the conveyance apparatus at the first time; detecting a second atmospheric air pressure within the conveyance system proximate the conveyance apparatus at the first selected time period prior to the first time; determining a change in atmospheric air pressure within the conveyance system proximate the conveyance apparatus in response to the first atmospheric air pressure and the second atmospheric air pressure within the conveyance system; and determining the height change of a conveyance apparatus within the conveyance system in response to the change in atmospheric air pressure within the conveyance system proximate the conveyance apparatus.

In addition to one or more of the features described herein, or as an alternative, further embodiments may include: applying a downward corrective value to the first time and the first time period prior to the first time; and determining that the conveyance apparatus was moving in the downward direction in a time period between the first time minus the downward corrective value and the first selected time period prior to the first time minus the downward corrective value.

In addition to one or more of the features described herein, or as an alternative, further embodiments may include that the conveyance system is an elevator system and the conveyance apparatus is an elevator car.

According to another embodiment, a method of monitoring a direction of motion of a conveyance apparatus within a conveyance system is provided. The method including: detecting a first height at a first time; detecting a second height at a first selected time period prior to the first time; detecting a height change of a conveyance apparatus within the conveyance system in response to the first height and the second height; determining whether the height change is less than a first selected height change; and determining that the conveyance apparatus is not moving in a downward direction when the height change is not less than the first selected height change.

In addition to one or more of the features described herein, or as an alternative, further embodiments may include that determining whether the height change is greater than the first selected height change; and determining that the conveyance apparatus is moving in an upward direction when the height change is greater than the first selected height change.

According to another embodiment, a method of monitoring a direction of motion of a conveyance apparatus within a conveyance system is provided. The method including: detecting a first atmospheric air pressure within the conveyance system proximate the conveyance apparatus at the first time; detecting a second atmospheric air pressure within the conveyance system proximate the conveyance apparatus at the first selected time period prior to the first time; determining a change in atmospheric air pressure within the conveyance system proximate the conveyance apparatus in response to the first atmospheric air pressure and the second atmospheric air pressure within the conveyance system; and determining the height change of a conveyance apparatus within the conveyance system in response to the change in atmospheric air pressure within the conveyance system proximate the conveyance apparatus.

In addition to one or more of the features described herein, or as an alternative, further embodiments may include: applying an upward corrective value to the first time and the first time period prior to the first time; and determining that the conveyance apparatus was moving in the upward direction in a time period between the first time minus the upward corrective value and the first selected time period prior to the first time minus the upward corrective value.

In addition to one or more of the features described herein, or as an alternative, further embodiments may include that the conveyance system is an elevator system and the conveyance apparatus is an elevator car.

Technical effects of embodiments of the present disclosure include determining a direction of motion of a conveyance apparatus within a conveyance system in response to a rate of change in atmospheric pressure within the conveyance system proximate the conveyance apparatus.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
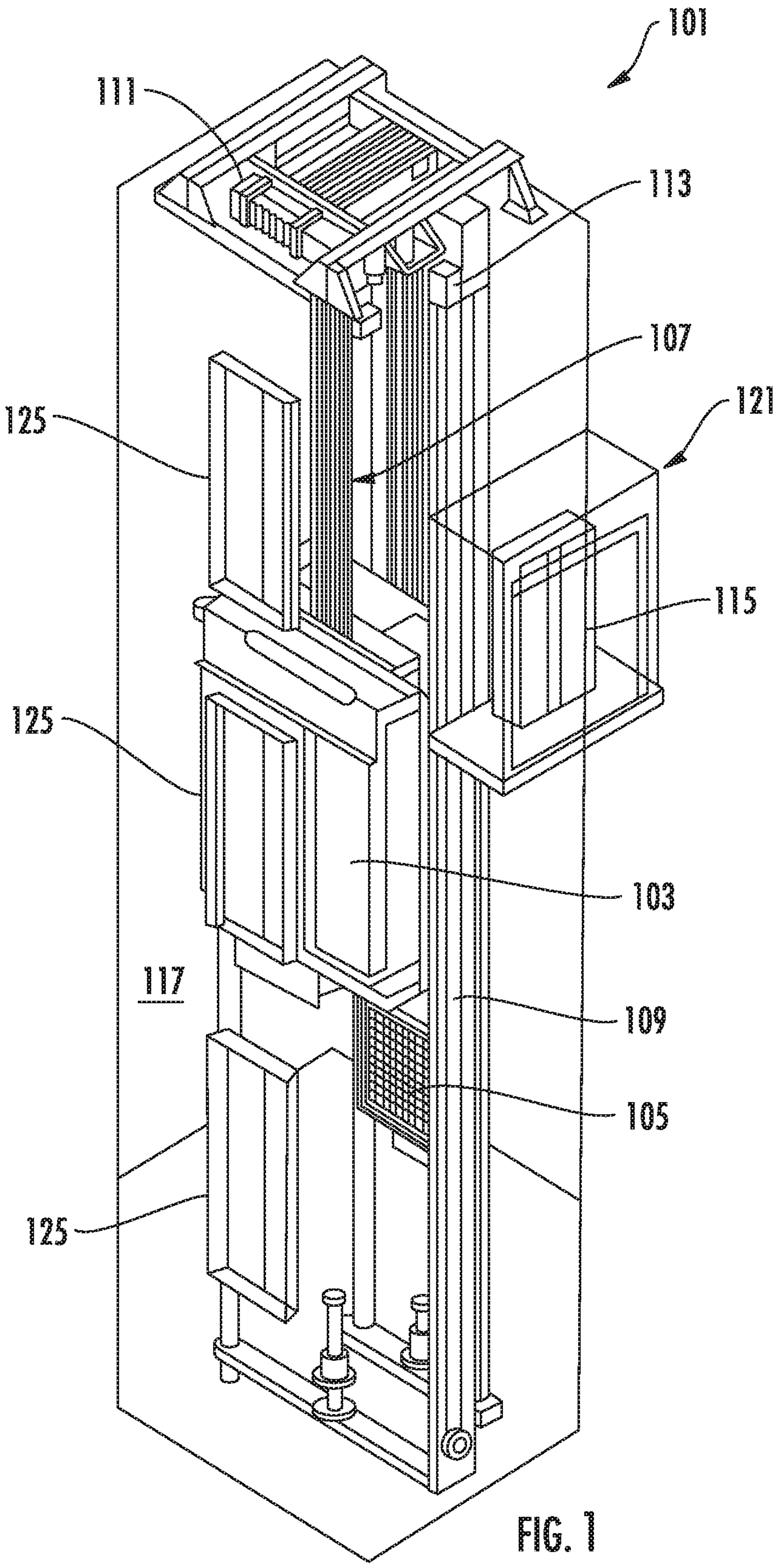
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance apparatus of the conveyance system such as an elevator car 103 of the elevator system 101. In another example, embodiments disclosed herein may be applicable conveyance systems such as an escalator system and a conveyance apparatus of the conveyance system such as a moving stair of the escalator system.

Figures 2, 3:
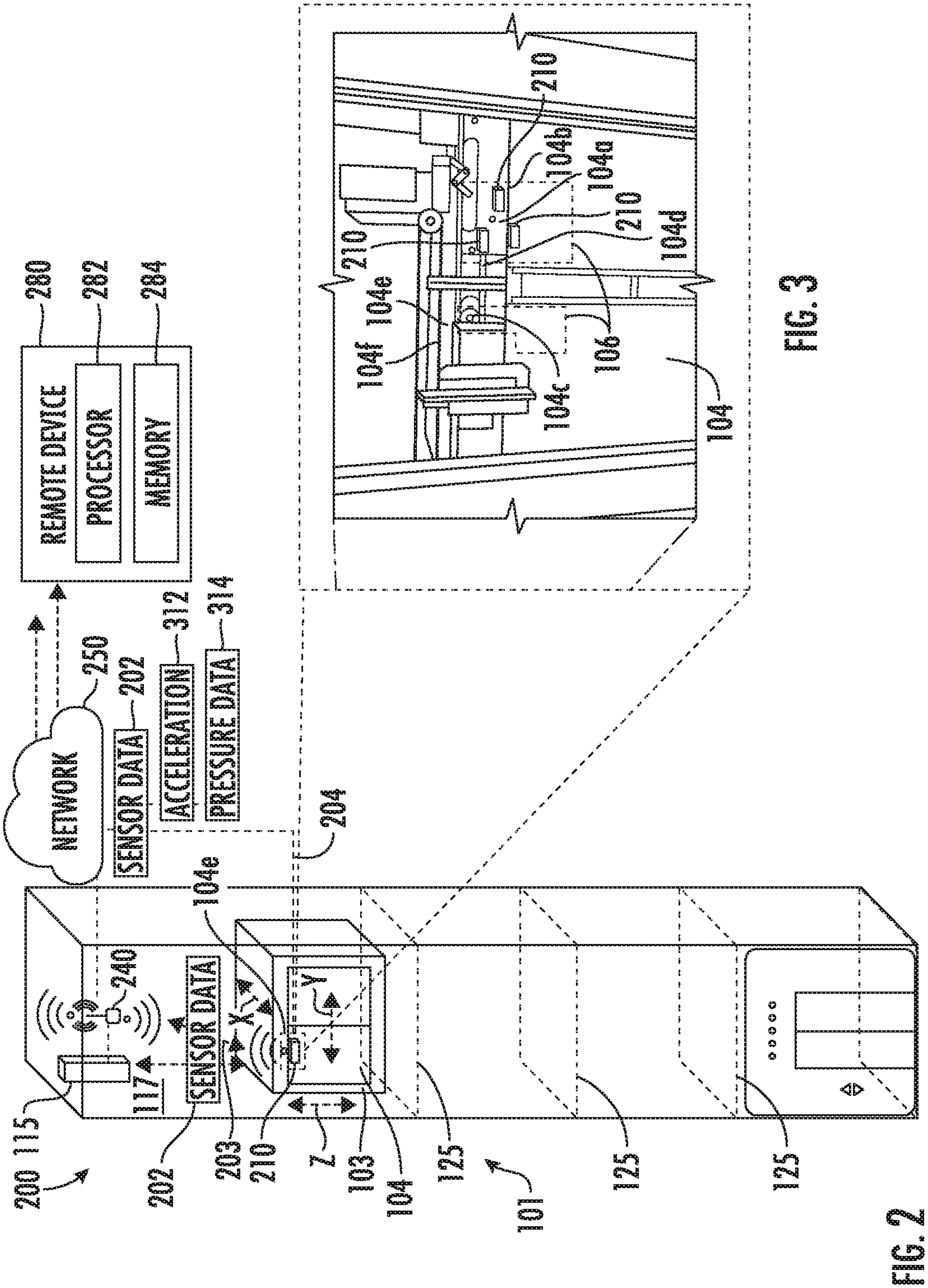
FIG. 2 is a schematic illustration of a sensor system for the elevator system of FIG. 1, in accordance with an embodiment of the disclosure.
FIG. 3 is a schematic illustration of the location of sensing apparatus of the sensor system of FIG. 2, in accordance with an embodiment of the disclosure.

Referring now to FIG. 2, with continued referenced to FIG. 1, a view of a sensor system 200 including a sensing apparatus 210 is illustrated, according to an embodiment of the present disclosure. The sensing apparatus 210 is configured to detect sensor data 202 of the elevator car 103 and transmit the sensor data 202 to a remote device 280. Sensor data 202 may include but is not limited to pressure data 314, vibratory signatures (i.e., vibrations over a period of time) or accelerations 312 and derivatives or integrals of accelerations 312 of the elevator car 103, such as, for example, distance, velocity, jerk, jounce, snap . . . etc. Sensor data 202 may also include light, sound, humidity, and temperature, or any other desired data parameter. The pressure data 314 may include atmospheric air pressure within the elevator shaft 117. It should be appreciated that, although particular systems are separately defined in the schematic block diagrams, each or any of the systems may be otherwise combined or separated via hardware and/or software. For example, the sensing apparatus 210 may be a single sensor or may be multiple separate sensors that are interconnected.

In an embodiment, the sensing apparatus 210 is configured to transmit sensor data 202 that is raw and unprocessed to the controller 115 of the elevator system 101 for processing. In another embodiment, the sensing apparatus 210 is configured to process the sensor data 202 prior to transmitting the sensor data 202 to the controller 115 through a processing method, such as, for example, edge processing. In another embodiment, the sensing apparatus 210 is configured to transmit sensor data 202 that is raw and unprocessed to a remote system 280 for processing. In yet another embodiment, the sensing apparatus 210 is configured to process the sensor data 202 prior to transmitting the sensor data 202 to the remote device 280 through a processing method, such as, for example, edge processing.

The processing of the sensor data 202 may reveal data, such as, for example, a number of elevator door openings/closings, elevator door time, vibrations, vibratory signatures, a number of elevator rides, elevator ride performance, elevator flight time, probable car position (e.g. elevation, floor number), releveling events, rollbacks, elevator car 103 x, y acceleration at a position: (i.e., rail topology), elevator car 103 x, y vibration signatures at a position: (i.e., rail topology), door performance at a landing number, nudging event, vandalism events, emergency stops, etc.

The remote device 280 may be a computing device, such as, for example, a desktop, a cloud based computer, and/or a cloud based artificial intelligence (AI) computing system. The remote device 280 may also be a mobile computing device that is typically carried by a person, such as, for example a smartphone, PDA, smartwatch, tablet, laptop, etc. The remote device 280 may also be two separate devices that are synced together, such as, for example, a cellular phone and a desktop computer synced over an internet connection.

The remote device 280 may be an electronic controller including a processor 282 and an associated memory 284 comprising computer-executable instructions that, when executed by the processor 282, cause the processor 282 to perform various operations. The processor 282 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 284 may be but is not limited to a random access memory (RAM), read only memory (ROM), or other electronic, optical, magnetic or any other computer readable medium.

The sensing apparatus 210 is configured to transmit the sensor data 202 to the controller 115 or the remote device 280 via short-range wireless protocols 203 and/or long-range wireless protocols 204. Short-range wireless protocols 203 may include but are not limited to Bluetooth, Wi-Fi, HaLow (801.11ah), zWave, ZigBee, or Wireless M-Bus. Using short-range wireless protocols 203, the sensing apparatus 210 is configured to transmit the sensor data 202 to directly to the controller 115 or to a local gateway device 240 and the local gateway device 240 is configured to transmit the sensor data 202 to the remote device 280 through a network 250 or to the controller 115. The network

250 may be a computing network, such as, for example, a cloud computing network, cellular network, or any other computing network known to one of skill in the art. Using long-range wireless protocols 204, the sensing apparatus 210 is configured to transmit the sensor data 202 to the remote device 280 through a network 250. Long-range wireless protocols 204 may include but are not limited to cellular, satellite, LTE (NB-IoT, CAT M1), LoRa, Satellite, Ingenu, or SigFox.

The sensing apparatus 210 may be configured to detect sensor data 202 including acceleration in any number of directions. In an embodiment, the sensing apparatus may detect sensor data 202 including accelerations 312 along three axis, an X axis, a Y axis, and a Z axis, as show in in FIG. 2. The X axis may be perpendicular to the doors 104 of the elevator car 103, as shown in FIG. 2. The Y axis may be parallel to the doors 104 of the elevator car 103, as shown in FIG. 2. The Z axis may be aligned vertically parallel with the elevator shaft 117 and pull of gravity, as shown in FIG. 2. The acceleration data 312 may reveal vibratory signatures generated along the X-axis, the Y-axis, and the Z-axis.

FIG. 3 shows a possible installation location of the sensing apparatus 210 within the elevator system 101. The sensing apparatus 210 may include a magnet (not show) to removably attach to the elevator car 103. In the illustrated embodiment shown in FIG. 3, the sensing apparatus 210 may be installed on the door hanger 104*a* and/or the door 104 of the elevator system 101. It is understood that the sensing apparatus 210 may also be installed in other locations other than the door hanger 104*a* and the door 104 of the elevator system 101. It is also understood that multiple sensing apparatus 210 are illustrated in FIG. 3 to show various locations of the sensing apparatus 210 and the embodiments disclosed herein may include one or more sensing apparatus 210. In another embodiment, the sensing apparatus 210 may be attached to a door header 104*e* of a door 104 of the elevator car 103. In another embodiment, the sensing apparatus 210 may be located on a door header 104*e* proximate a top portion 104*f* of the elevator car 103. In another embodiment, the sensing apparatus 210 is installed elsewhere on the elevator car 103, such as, for example, directly on the door 104.

As shown in FIG. 3, the sensing apparatus 201 may be located on the elevator car 103 in the selected areas 106, as shown in FIG. 3. The doors 104 are operably connected to the door header 104*e* through a door hanger 104*a* located proximate a top portion 104*b* of the door 104. The door hanger 104*a* includes guide wheels 104*c* that allow the door 104 to slide open and close along a guide rail 104*d* on the door header 104*e*. Advantageously, the door hanger 104*a* is an easy to access area to attach the sensing apparatus 210 because the door hanger 104*a* is accessible when the elevator car 103 is at landing 125 and the elevator door 104 is open. Thus, installation of the sensing apparatus 210 is possible without taking special measures to take control over the elevator car 103. For example, the additional safety of an emergency door stop to hold the elevator door 104 open is not necessary as door 104 opening at landing 125 is a normal operation mode. The door hanger 104*a* also provides ample clearance for the sensing apparatus 210 during operation of the elevator car 103, such as, for example, door 104 opening and closing. Due to the mounting location of the sensing apparatus 210 on the door hanger 104*a*, the sensing apparatus 210 may detect open and close motions (i.e., acceleration) of the door 104 of the elevator car 103 and a door at the landing 125. Additionally mounting the sensing apparatus 210 on the hanger 104*a* allows for recording of a ride quality of the elevator car 103.

Figure 4:
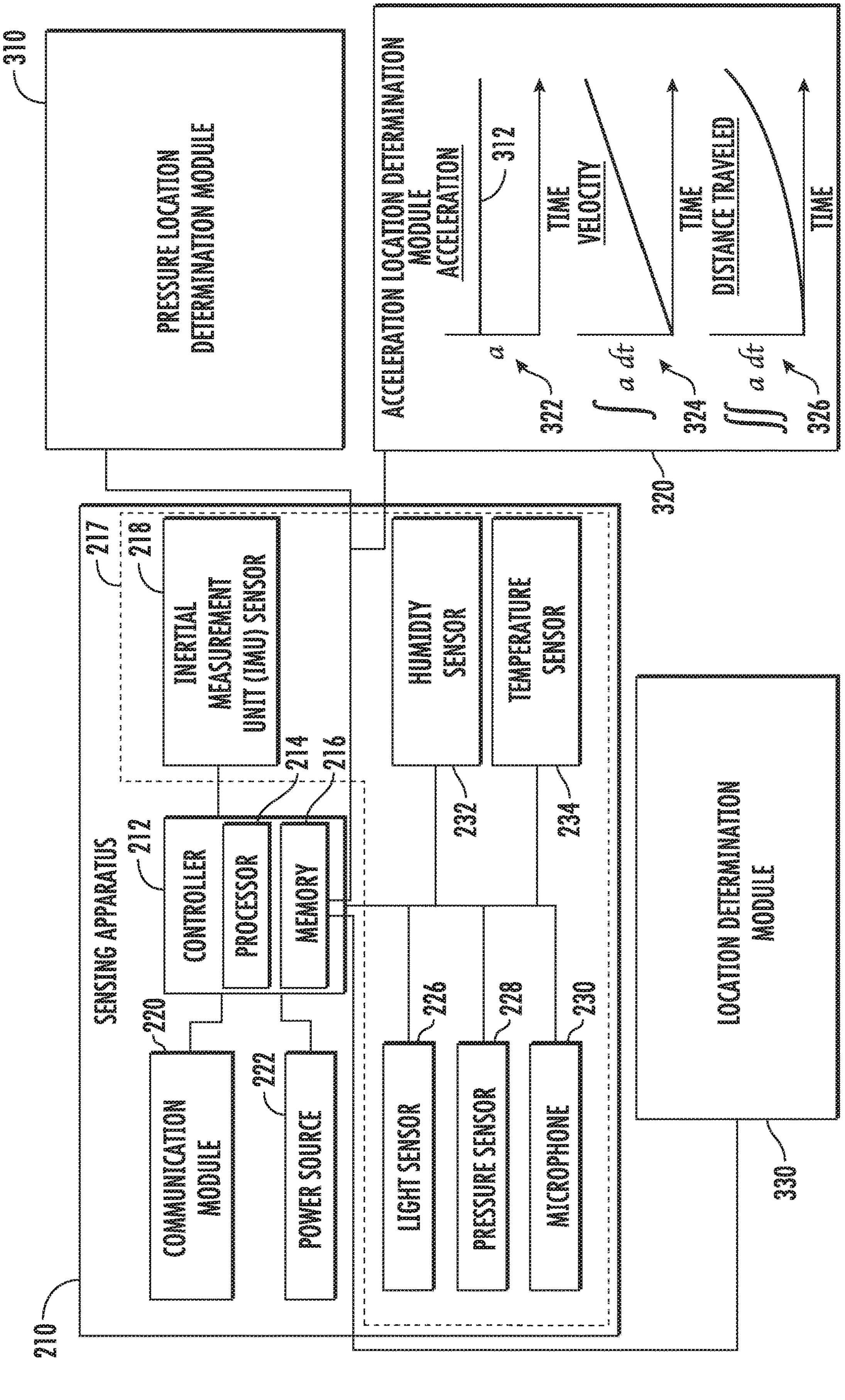
FIG. 4 is a schematic illustration of a sensing apparatus of the sensor system of FIG. 2, in accordance with an embodiment of the disclosure.

FIG. 4 illustrates a block diagram of the sensing apparatus 210 of the sensing system of FIGS. 2 and 3. It should be appreciated that, although particular systems are separately defined in the schematic block diagram of FIG. 4, each or any of the systems may be otherwise combined or separated via hardware and/or software. As shown in FIG. 4, the sensing apparatus 210 may include a controller 212, a plurality of sensors 217 in communication with the controller 212, a communication module 220 in communication with the controller 212, and a power source 222 electrically connected to the controller 212.

The plurality of sensors 217 includes an inertial measurement unit (IMU) sensor 218 configured to detect sensor data 202 including accelerations 312 of the sensing apparatus 210 and the elevator car 103 when the sensing apparatus 210 is attached to the elevator car 103. The IMU sensor 218 may be a sensor, such as, for example, an accelerometer, a gyroscope, or a similar sensor known to one of skill in the art. The accelerations 312 detected by the IMU sensor 218 may include accelerations 312 as well as derivatives or integrals of accelerations, such as, for example, velocity, jerk, jounce, snap . . . etc. The IMU sensor 218 is in communication with the controller 212 of the sensing apparatus 210.

The plurality of sensors 217 includes a pressure sensor 228 is configured to detect sensor data 202 including pressure data 314, such as, for example, atmospheric air pressure within the elevator shaft 117. The pressure sensor 228 may be a pressure altimeter or barometric altimeter in two non-limiting examples. The pressure sensor 228 is in communication with the controller 212.

The plurality of sensors 217 may also include additional sensors including but not limited to a light sensor 226, a pressure sensor 228, a microphone 230, a humidity sensor 232, and a temperature sensor 234. The light sensor 226 is configured to detect sensor data 202 including light exposure. The light sensor 226 is in communication with the controller 212. The microphone 230 is configured to detect sensor data 202 including audible sound and sound levels. The microphone 230 is in communication with the controller 212. The humidity sensor 232 is configured to detect sensor data 202 including humidity levels. The humidity sensor 232 is in communication with the controller 212. The temperature sensor 234 is configured to detect sensor data 202 including temperature levels. The temperature sensor 234 is in communication with the controller 212.

The controller 212 of the sensing apparatus 210 includes a processor 214 and an associated memory 216 comprising computer-executable instructions that, when executed by the processor 214, cause the processor 214 to perform various operations, such as, for example, edge pre-processing or processing the sensor data 202 collected by the IMU sensor 218, the light sensor 226, the pressure sensor 228, the microphone 230, the humidity sensor 232, and the temperature sensor 234. In an embodiment, the controller 212 may process the accelerations 312 and/or the pressure data 314 in order to determine a probable location of the elevator car 103, discussed further below. The processor 214 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 216 may be a storage device, such as, for example, a random access memory (RAM), read only memory (ROM), or other electronic, optical, magnetic or any other computer readable medium.

The power source 222 of the sensing apparatus 210 is configured to store and supply electrical power to the sensing apparatus 210. The power source 222 may include an energy storage system, such as, for example, a battery system, capacitor, or other energy storage system known to one of skill in the art. The power source 222 may also generate electrical power for the sensing apparatus 210. The power source 222 may also include an energy generation or electricity harvesting system, such as, for example synchronous generator, induction generator, or other type of electrical generator known to one of skill in the art.

The sensing apparatus 210 includes a communication module 220 configured to allow the controller 212 of the sensing apparatus 210 to communicate with the remote device 280 and/or controller 115 through at least one of short-range wireless protocols 203 and long-range wireless protocols 204. The communication module 220 may be configured to communicate with the remote device 280 using short-range wireless protocols 203, such as, for example, Bluetooth, Wi-Fi, HaLow (801.11ah), Wireless M-Bus, zWave, ZigBee, or other short-range wireless protocol known to one of skill in the art. Using short-range wireless protocols 203, the communication module 220 is configured to transmit the sensor data 202 to a local gateway device 240 and the local gateway device 240 is configured to transmit the sensor data 202 to a remote device 280 through a network 250, as described above. The communication module 220 may be configured to communicate with the remote device 280 using long-range wireless protocols 204, such as for example, cellular, LTE (NB-IoT, CAT M1), LoRa, Ingenu, SigFox, Satellite, or other long-range wireless protocol known to one of skill in the art. Using long-range wireless protocols 204, the communication module 220 is configured to transmit the sensor data 202 to a remote device 280 through a network 250. In an embodiment, the short-range wireless protocol 203 is sub GHz Wireless M-Bus. In another embodiment, the long-range wireless protocol is SigFox. In another embodiment, the long-range wireless protocol is LTE NB-IoT or CAT M1 with 2G fallback.

The sensing apparatus 210 includes a location determination module 330 configured to determine a location (i.e., position) of the elevator car 103 within the elevator shaft 117. The location of the elevator car 103 may be fixed locations along the elevator shaft 117, such as for example, the landings 125 of the elevator shaft 117. The locations may be equidistantly spaced apart along the elevator shaft 117 such as, for example, 5 meters or any other selected distance. Alternatively, the locations may be or intermittently spaced apart along the elevator shaft 117.

The location determination module 330 may utilize various approaches to determine a location of the elevator car 103 within the elevator shaft 117. The location determination module 330 may be configured to determine a location of the elevator car 103 within the elevator shaft 117 using at least one of a pressure location determination module 310 and an acceleration location determination module 320.

The acceleration location determination module 320 is configured to determine a distance traveled of the elevator car 103 within the elevator shaft 117 in response to the acceleration of the elevator car 103 detected along the Y axis. The sensing apparatus 210 may detect an acceleration along the Y axis shown at 322 and may integrate the acceleration to get a velocity of the elevator car 103 at 324. At 326, the sensing apparatus 210 may also integrate the velocity of the elevator car 103 to determine a distance traveled by the elevator car 103 within the elevator shaft 117 during the acceleration 312 detected at 322. The direction of travel of the elevator car 103 may also be determined in response to the acceleration 312 detected. The location determination module 330 may then determine the location of the elevator car 103 within the elevator shaft 117 in response to a starting location and a distance traveled away from that starting location. The starting location may be based upon tracking the past operation and/or movement of the elevator car 103.

The pressure location determination module 310 is configured to detect an atmospheric air pressure within the elevator shaft 117 when the elevator car 103 is in motion and/or stationary using the pressure sensor 228. The pressure detected by the pressure sensor 228 may be associated with a location (e.g., height, elevation) within the elevator shaft 117 through either a look up table or a calculation of altitude using the barometric pressure change in two non-limiting embodiments. The direction of travel of the elevator car 103 may also be determined in response to the change in pressure detected via the pressure data 314. The pressure sensor 228 may need to periodically detect a baseline pressure to account for changes in atmospheric pressure due to local weather conditions. For example, this baseline pressure may need to be detected daily, hourly, or weekly in non-limiting embodiments. In some embodiments, the baseline pressure may be detected whenever the elevator car 103 is stationary, or at certain intervals when the elevator car 103 is stationary and/or at a known location. The acceleration of the elevator car 103 may also need to be detected to know when the elevator car 103 is stationary and then when the elevator car 103 is stationary the sensing apparatus 210 may need to be offset to compensate the sensor drift and environment drift.

In one embodiment, the pressure location determination module 310 may be used to verify and/or modify a location of the elevator car 102 within the elevator shaft 117 determined by the acceleration location determination module 320. In another embodiment, the acceleration location determination module 320 may be used to verify and/or modify a location of the elevator car 102 within the elevator shaft 117 determined by the pressure location determination module 310. In another embodiment, the pressure location determination module 310 may be prompted to determine a location of the elevator car 103 within the elevator shaft 117 in response to an acceleration detected by the IMU sensor 218.

Figure 5:
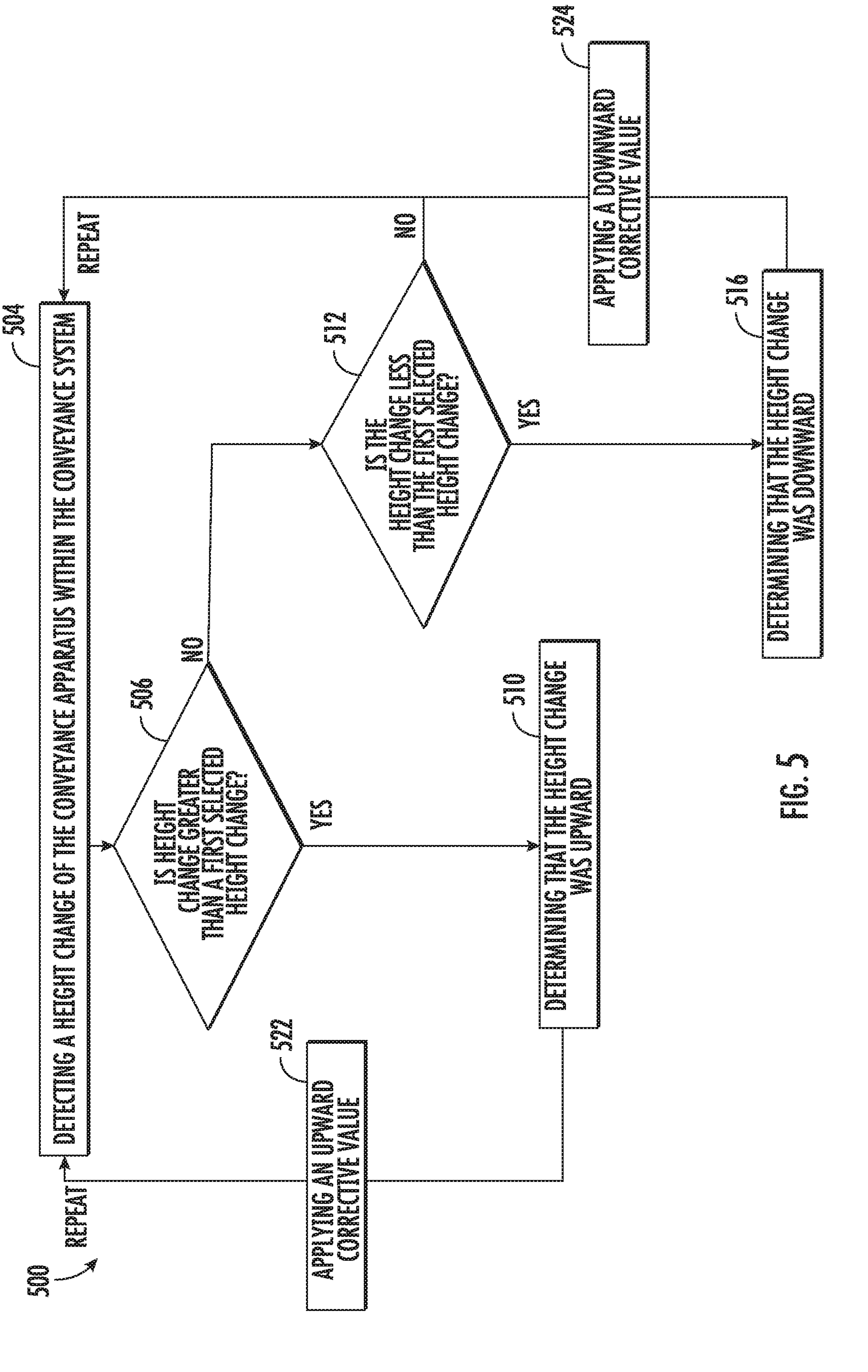
FIG. 5 is a flow chart of a method of monitoring a direction of motion a conveyance apparatus within a conveyance system, in accordance with an embodiment of the disclosure.
Figure 6:
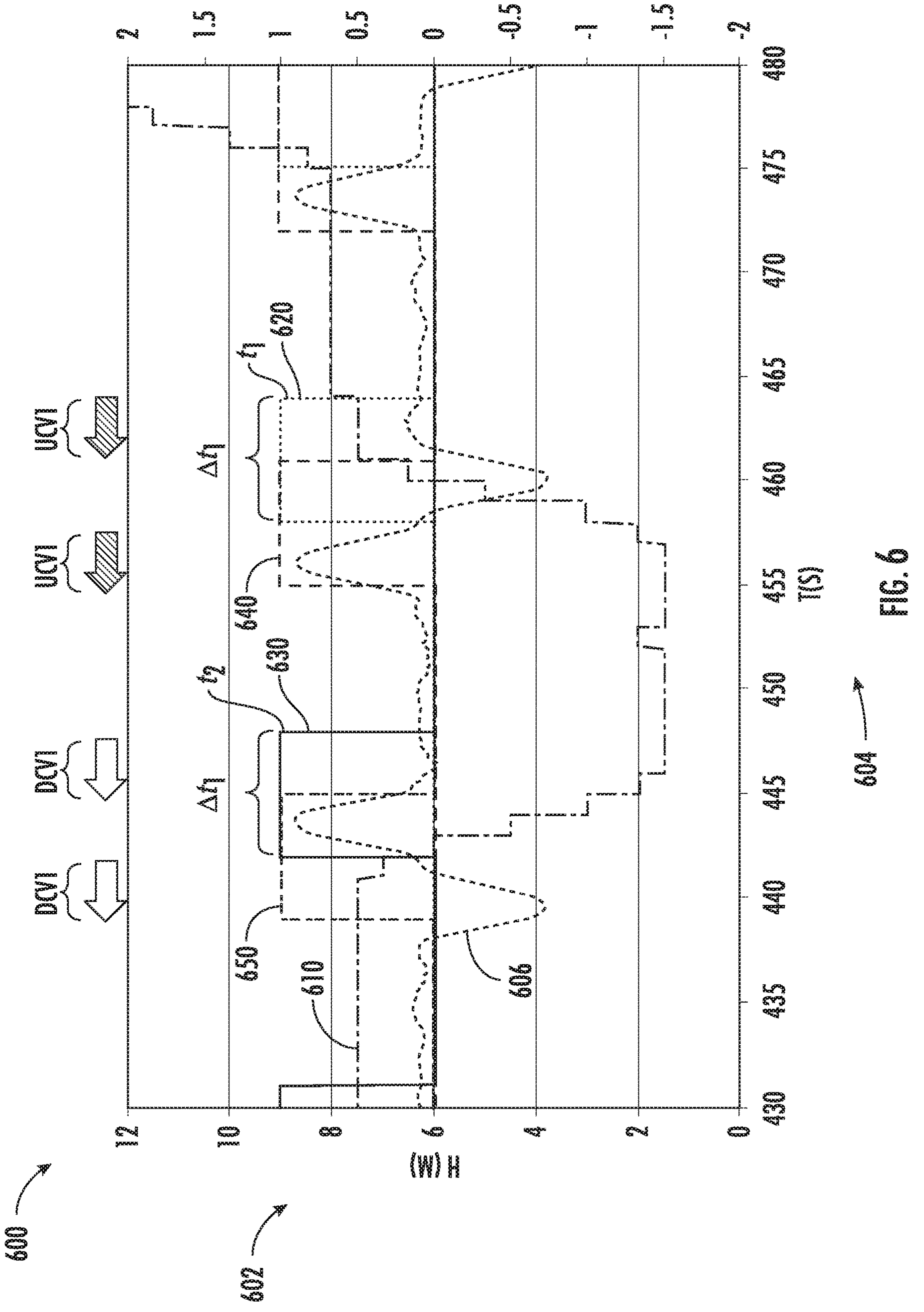
FIG. 6 is a chart illustrated detection of a direction of motion the conveyance apparatus within the conveyance system, in accordance with an embodiment of the disclosure.

Referring now to FIGS. 5 and 6, while referencing components of FIGS. 1-4. FIG. 5 shows a flow chart of a method 500 of monitoring a direction of motion of a conveyance apparatus within a conveyance system, in accordance with an embodiment of the disclosure. In an embodiment, the conveyance system is an elevator system 101 and the conveyance apparatus is an elevator car 103. In an embodiment, the method 500 may be performed by at least one of the sensing apparatus 210, the controller 115, and the remote device 280

At block 504, a height change of the conveyance apparatus within the conveyance system is detected. In an embodiment, the height change may be determined by detecting a change in atmospheric air pressure within the conveyance system. In an embodiment, a first atmospheric air pressure is detected within the conveyance system proximate the conveyance apparatus at a first time and a second atmospheric air pressure is detected within the conveyance system proximate the conveyance apparatus at a second time.

As discussed above, the atmospheric air pressure (e.g., the first atmospheric air pressure and the second atmospheric air pressure) may be detected by the pressure sensor 228 may be associated with a location (e.g., height) within the elevator shaft 117 through either a look up table or a calculation of altitude using the barometric pressure change in two non-limiting embodiments. In another embodiment, the pressure sensor 228 may need to periodically detect a baseline pressure to account for changes in atmospheric pressure due to local weather conditions or sensor drift. For example, this baseline pressure may need to be detected daily, hourly, or weekly in non-limiting embodiments.

A change in atmospheric air pressure proximate the conveyance apparatus is determined in response to the first atmospheric air pressure and the second atmospheric air pressure within the conveyance system, which may mean a change in height. A height change height change of a conveyance apparatus within the conveyance system between the first time and the second time may be determined in response to the change in atmospheric air pressure within the conveyance system proximate the conveyance apparatus.

Once a change in height has been detected, then a direction of motion (e.g., upward or downward) of the conveyance apparatus within the conveyance system may be determined in response to the change in height. The direction of motion of the conveyance apparatus is determined by blocks 506-516. For example, changes in height over a period of time may indicate motion. The method may use an up($t_1$) function to indicate that the conveyance apparatus is moving up at a first time $t_1$ and a down($t_2$) function to indicate that the conveyance apparatus is moving down at a second time $t_2$. It is understood that the first time $t_1$ may be equivalent to the second time $t_2$ (i.e., the same time) and the first time $t_1$ and the second time $t_2$ are illustrated as different time in FIG. 6 for ease of explanation so that they may appear separately in FIG. 6.

As illustrated in FIG. 6, a change in height 602 of the conveyance apparatus over a period of time 604 is detected by a sensing apparatus 210 detecting a change in atmospheric pressure, as shown by line 610 in chart 600. Vertical acceleration of the conveyance apparatus is also plotted on chart 600, as shown by line 606, for exemplary purposes. As shown by line 606, the vertical acceleration of the conveyance apparatus may not always by correlated with vertical movement of the conveyance apparatus, as shown by line 610, which may be due to various vibrations experience by the conveyance apparatus while stopped (e.g., doors 104 opening and closing, or passengers moving in and out, etc.). Thus, this is why it may be advantageous to utilize a detected pressure change to determine a change in height of the conveyance apparatus versus a detected vertical acceleration.

At block 506, it is determined whether the height change is greater than a first selected height change $\Delta h_1$ between a first time $t_1$ and a first selected time period $\Delta T_1$ prior to the first time $t_1$. At block 506, the method 500 may utilize equation (i).

$$h(t_1)-h(t_1-\Delta T_1)>\Delta h_1 \text{ THEN up}(t_1)=\text{TRUE} \quad \text{(i)}$$

Where the $h(t_1)$ is the height of the conveyance apparatus at the first time $t_1$, and the $h(t_1-\Delta T_1)$ is the height of the conveyance apparatus at the first selected time period $\Delta T_1$ prior to the first time $t_1$. In an embodiment, the first selected time period $\Delta T_1$ may be five seconds and the first selected height change $\Delta h_1$ may be 1.5 meters (4.92 feet). At block 506, if the height change is greater than the first selected height change $\Delta h_1$ then the up($t_1$) function is true as shown by line 620 of FIG. 6 and the method 500 moves onto block 510 where it is determined that the height change was upward and then the method 500 may move to block 522. At block 506, if the height change is not greater than the first selected height change $\Delta h_1$ then the up(t) function is not true (i.e., FALSE) and the method 500 moves onto block 512.

At block 522, an upward corrective value UCV1 may be subtracted from the first selected time period $\Delta T_1$ and the first time $t_1$ to shift the first selected time period $\Delta TP_1$ and the first time $t_1$ into the past by the upward corrective value UCV1 because there may be a delay in detecting the upward movement of the conveyance apparatus and actual upward movement. The upward corrective value UCV1 shifts the true up($t_1$) function as shown by line 620 to line 640 of FIG. 6. The upward corrective value UCV1 may be determined from close historical examination (e.g., experimentation) of the time delay in detecting the upward movement of the conveyance apparatus. In one embodiment, the upward corrective value UCV1 may be equal to three seconds.

The upward corrective value UCV1 may be applied to the first time $t_1$ and the first time period $\Delta T_1$ prior to the first time $t_1$ and it may be determined that the conveyance apparatus was moving in the upward direction in a time period between the first time $t_1$ minus the upward corrective value UCV1 and the first selected time period $\Delta T_1$ prior to the first time $t_1$ minus the upward corrective value UCV1.

At block 512, it is determined whether the height change is less than the first selected height change $\Delta h_1$ between a second time $t_2$ and a first selected time period $\Delta T_1$ prior to the second time $t_2$. At block 506, the method 500 may utilize equation (ii).

$$h(t_2)-h(t_2-\Delta T_1)<\Delta h_1 \text{ THEN down}(t_2)=\text{TRUE} \quad \text{(ii)}$$

In an embodiment, the first selected time period $\Delta T_1$ may be five seconds and the first selected height change $\Delta h_1$ may be 1.5 meters (4.92 feet). At block 512, if the height change is less than the first selected height change $\Delta h_1$ then the down($t_2$) function is true as shown by line 630 of FIG. 6 and the method 500 moves onto block 516 where it is determined that the height change was downward and then the method 500 may move to block 524. At block 512, if the height change is not less than the first selected height change $\Delta h_1$ then the down($t_2$) function not true (i.e., FALSE) and the method 500 moves onto block 504 to repeat the method 500.

At block 524, a downward corrective value DCV1 may be subtracted from the first selected time period $\Delta T_1$ and the second time $t_2$ to shift the first selected time period $\Delta TP_1$ and the second time $t_2$ into the past by the downward corrective value DCV1 because there may be a delay in detecting the downward movement of the conveyance apparatus and actual downward movement. The downward corrective value DCV1 shifts the true down($t_2$) function as shown by line 630 to line 650 of FIG. 6. The downward corrective value DCV1 may be determined from close historical examination (e.g., experimentation) of the time delay in detecting the downward movement of the conveyance apparatus. In one embodiment, the downward corrective value DCV1 may be equal to three seconds.

The downward corrective value DCV1 may be applied to the first time $t_1$ and the first time period $\Delta T_1$ prior to the first time $t_1$ and it may be determined that the conveyance apparatus was moving in the downward direction in a time period between the first time $t_1$ minus the downward corrective value DCV1 and the first selected time period $\Delta T_1$ prior to the first time first time $t_1$ minus the downward corrective value DCV1.

While the above description has described the flow process of FIG. 5 in a particular order, it should be appreciated that unless otherwise specifically required in the attached claims that the ordering of the steps may be varied. For example, in one embodiment, it may be determined first whether the conveyance apparatus is moving in the upward direction (as shown in FIG. 5), whereas in another embodiment it may be determined first whether the conveyance apparatus is moving in the downward direction, whereas in another embodiment it may be determined simultaneously whether the conveyance apparatus is moving in the upward direction or downward direction.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of monitoring a direction of motion of a conveyance apparatus within a conveyance system, the method comprising:

detecting a first height of the conveyance apparatus at a first time;

detecting a second height of the conveyance apparatus at a first selected time period prior to the first time;

detecting a height change of the conveyance apparatus within the conveyance system in response to the first height and the second height;

determining whether the height change is greater than a first selected height change;

determining that the conveyance apparatus is moving in an upward direction when the height change is greater than the first selected height change;

applying an upward corrective value to shift the first time and the first time period prior to the first time; and determining that the conveyance apparatus was moving in the upward direction in a time period between the first time minus the upward corrective value and the first selected time period prior to the first time minus the upward corrective value.

2. The method of claim 1, wherein:

detecting the first height comprises detecting a first atmospheric air pressure within the conveyance system proximate the conveyance apparatus at the first time;

detecting the second height comprises detecting a second atmospheric air pressure within the conveyance system proximate the conveyance apparatus at the first selected time period prior to the first time;

wherein detecting the height change of the conveyance apparatus within the conveyance system comprises:

determining a change in atmospheric air pressure within the conveyance system proximate the conveyance apparatus in response to the first atmospheric air pressure and the second atmospheric air pressure within the conveyance system; and determining the height change of a conveyance apparatus within the conveyance system in response to the change in atmospheric air pressure within the conveyance system proximate the conveyance apparatus.

3. The method of claim 1, wherein the conveyance system is an elevator system and the conveyance apparatus is an elevator car.

4. A method of monitoring a direction of motion of a conveyance apparatus within a conveyance system, the method comprising:

detecting a first height of the conveyance apparatus at a first time;

detecting a second height of the conveyance apparatus at a first selected time period prior to the first time;

detecting a height change of the conveyance apparatus within the conveyance system in response to the first height and the second height;

determining whether the height change is less than a first selected height change; and determining that the conveyance apparatus is moving in a downward direction when the height change is less than the first selected height change;

applying a downward corrective value to shift the first time and the first time period prior to the first time; and determining that the conveyance apparatus was moving in the downward direction in a time period between the first time minus the downward corrective value and the first selected time period prior to the first time minus the downward corrective value.

5. The method of claim 4, wherein:

detecting the first height comprises detecting a first atmospheric air pressure within the conveyance system proximate the conveyance apparatus at the first time;

detecting the second height comprises detecting a second atmospheric air pressure within the conveyance system proximate the conveyance apparatus at the first selected time period prior to the first time;

wherein detecting the height change of the conveyance apparatus within the conveyance system comprises:

determining a change in atmospheric air pressure within the conveyance system proximate the conveyance apparatus in response to the first atmospheric air pressure and the second atmospheric air pressure within the conveyance system; and determining the height change of a conveyance apparatus within the conveyance system in response to the change in atmospheric air pressure within the conveyance system proximate the conveyance apparatus.

6. The method of claim 4, wherein the conveyance system is an elevator system and the conveyance apparatus is an elevator car.

* * * * *